P. R. HINKLE.
NUT LOCK.
APPLICATION FILED JUNE 24, 1910.
1,001,269.
Patented Aug. 22, 1911.
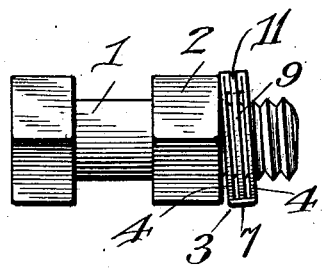
Fig. 1.
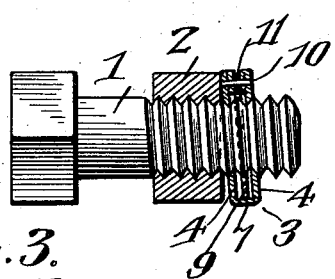
Fig. 2.
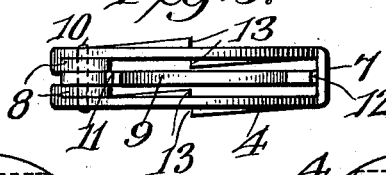
Fig. 3.
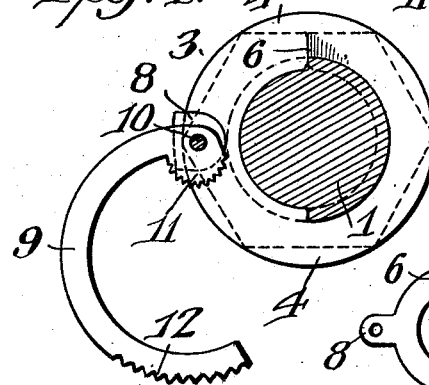
Fig. 4.
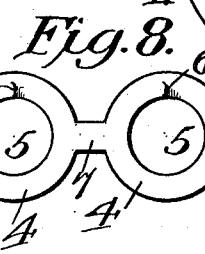
Fig. 5.
Fig. 8.
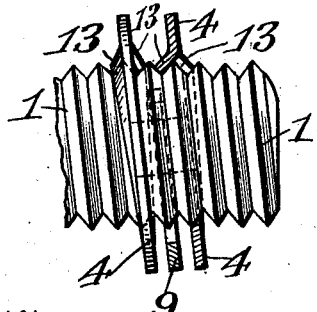
Fig. 6.
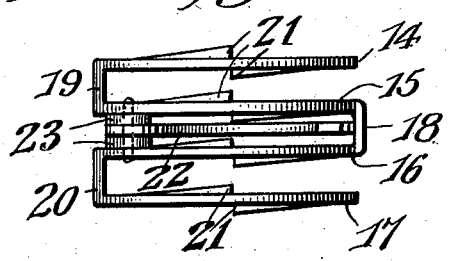
Fig. 7.
Witnesses
Jas. F. McCathran
R. W. Bishop
Paris R. Hinkle, Inventor
By E. G. Siggers
Attorney

UNITED STATES PATENT OFFICE.

PARIS R. HINKLE, OF LOS ANGELES, CALIFORNIA.

NUT-LOCK.

1,001,269.

Specification of Letters Patent.  Patented Aug. 22, 1911.

Application filed June 24, 1910. Serial No. 568,737.

*To all whom it may concern:*

Be it known that I, PARIS R. HINKLE, a citizen of the United States, residing at Los Angeles, in the county of Los Angeles and State of California, have invented a new and useful Nut-Lock, of which the following is a specification.

This invention relates to improvements in nut locks and it seeks to provide a cheap and simple device by the use of which nuts will be effectually prevented from working from the bolts to which they are applied and which will be capable of application to any ordinary bolt without defacing the same.

The invention has for its object the construction of a nut lock from sheet metal which, when applied to a bolt, will engage the same so as to be easily turned home against the nut and which will be equipped with simple means whereby rotation of the bolt after the lock is applied will serve to firmly bind the lock in place so that the loss of the nut cannot occur.

With these and other minor objects in view, the invention consists in certain novel features which are illustrated in the accompanying drawings and which will be hereinafter first fully described and then more specifically pointed out in the appended claims.

In the drawings,—Figure 1 is a side elevation of a bolt and nut equipped with my improvements. Fig. 2 is a similar view showing the nut and lock in section. Fig. 3 is an enlarged side elevation of the lock removed from the bolt. Fig. 4 is a horizontal section showing the locking lever released from the bolt. Fig. 5 is a similar view showing the locking lever engaging the bolt and held against the same. Fig. 6 is an enlarged view partly in elevation and partly in section to show the application of the lock to the bolt. Fig. 7 is an elevation of a slight modification of the lock. Fig. 8 is a detail plan view of the blank which is folded to produce the lock.

The bolt 1 and the nut 2 fitted thereon may be of any desired size or shape. The lock 3 will preferably be of substantially the same diameter as the nut and is mounted on the bolt adjacent the outer face of the nut so as to bear against the same and thereby lock the nut to the bolt. In constructing the lock, I employ a sheet metal blank consisting of two bodies 4 having circular openings 5 at their centers and having small cuts or slits 6 leading radially from the said openings 5 for a short distance at one side of the same. The two bodies 4 are connected by a tongue 7, and, diametrically opposite the said tongue, lugs 8 project from the edge of the blank, as shown clearly in Fig. 8. In folding the blank, these lugs 8 are folded over upon the bodies from which they project and the tongue 7 is then folded at its point of junction with each body so that the bodies will be brought into parallelism, as shown most clearly in Fig. 3, and held at the proper distance apart by the said tongue. The lugs 8 serve as reinforcements and spacers to maintain the locking lever 9 centrally between the bodies, as shown in Fig. 3, the said locking lever being secured to and between the bodies by a pin or rivet 10 inserted through the bodies, the alined lugs 8, and the end of the lever, as will be readily understood. This locking lever 9 is provided with an eccentric head 11 adjacent the pivot pin 10, and its free end is provided with a milled or serrated surface 12 on its outer edge adapted to engage the tongue 7 when the lock is applied to a bolt, as shown clearly in Fig. 5. The inner circular edge of each body 4 or member of the lock is sprung in opposite directions at the opposite sides of the cuts or slits 6, as shown at 13, whereby said edges are adapted to ride within the grooves of the threaded portion of the bolt, as shown most clearly in Fig. 6.

The nut 2 is mounted on the bolt and turned home against the object to be secured in the usual manner, after which the lock is fitted on the bolt with its edges or teeth 13 engaging the threads of the bolt, and is turned home against the nut, as shown in Figs. 1 and 2. The lock may rotate easily upon the bolt when the fastening lever is in the position shown in Fig. 4, as the eccentric head of the lever is then away from the bolt and does not engage the same. After the lock has been turned home against the nut, however, the lever is swung to the position shown in Fig. 5 with its milled free end 12 engaging the inner face of the tongue 7, thereby bringing the eccentric portion of the head 11 into engagement with the bolt so as to bind upon the same. The supporting or carrying members of the lock will be constructed of sheet metal and will, consequently, have some resiliency, while the locking lever will be constructed of hard metal and will, consequently, bind firmly against the bolt so as to effectually hold the same. The free end of the lever may be readily sprung in place behind the tongue 7 and will be firmly held in the locking position by reason of the resiliency of the main body or supporting members of the lock. With the parts as shown in Fig. 5, it will be readily seen that rotation of the lock or the nut in the direction indicated by the arrow, which is necessary in order to release the same from the bolt, will be effectually prevented, inasmuch as such movement will make the head 11 of the locking lever bind more firmly upon the bolt. The serrations at the free end of the locking lever aid in holding the same against the tongue 7, while at the same time they enable the operator to easily manipulate the lever when, for any reason, it is necessary to remove the lock and the nut from the bolt.

The lock being constructed of sheet metal will be light and inexpensive so that it may be readily manufactured and easily applied to a bolt. When on the bolt, it may readily be turned home as the inner circular edges of the spring bodies will engage the threads and ride therein, as will be understood on reference to Fig. 6. When the lock has been turned home, the opposite edges of the slits 6 will bind upon the threads of the bolt so as to aid in holding the device to the bolt.

For ordinary purposes, a lock consisting of two bodies or members 4 will be found sufficient and will securely hold the nut, but for unusual sizes of bolts or peculiar pitches of the bolt threads, it may be found desirable to provide more than two resilient thread-engaging members, and in Fig. 7 I have illustrated one method of meeting this requirement. In this form of lock the blank is made longer than in the form previously described and is bent in reverse directions so as to provide a plurality of members 14, 15, 16 and 17 connected at alternately opposite sides by tongues 18, 19 and 20. Each member will be provided with teeth 21 corresponding to the teeth 13, and the locking lever 22 will be mounted between the intermediate members 15 and 16 so as to engage the tongue 18 connecting the same, and will be held centrally between the members by washers 23 fitted on the pivot pin 24 between the locking lever and the said supporting members, as shown, and as will be readily understood.

While I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described my invention, what I claim is:—

1. A nut lock consisting of a plurality of resilient members, a tongue connecting the same, and a locking lever pivotally mounted between the said members, and adapted to engage the said tongue.

2. The combination with a bolt, and a nut mounted thereon, of a lock consisting of resilient members engaging the threads of the bolt, a tongue connecting said members, and a locking lever pivotally mounted between the members and arranged to engage the bolt and held in such engagement by the said tongue.

3. The combination with a bolt, and a nut mounted thereon, of a lock fitted on the bolt against the nut and comprising resilient members engaging the threads of the bolt, a tongue connecting the said members, a locking lever pivotally mounted between the said members and having an eccentric head adapted to bear against the bolt adjacent its pivotal connection with the resilient members, the free end of the lever being adapted to engage and be held by the said tongue.

4. The combination with a bolt, and a nut mounted thereon, of a lock consisting of a pair of resilient members engaging the bolt and lying against the nut, and a locking lever pivotally mounted between the said resilient members and provided with an eccentric head adjacent its pivot adapted to engage the bolt.

5. The combination with a bolt, and a nut mounted thereon, of a lock fitted against the nut and comprising a plurality of resilient members each having teeth riding on the threads of the bolt, and a locking lever pivotally mounted between the said members and adapted to engage the bolt.

6. A nut lock comprising a plurality of resilient members, a locking lever pivotally mounted between the said members, and spacing means fitted between the locking lever and the members to maintain the lever centrally therebetween.

7. A nut lock consisting of a pair of resilient members having central openings to receive a bolt, an integral tongue connecting the said members, lugs formed on the said members opposite the said tongue adapted to be folded in against the opposed faces of the members, and a locking lever pivotally mounted between the said lugs and adapted to engage the said tongue.

8. The combination with a bolt, and a nut thereon, of a lock consisting of resilient members engaging the threads of the bolt, a tongue connecting said members, and a locking lever mounted between the members to bind upon the bolt and having a serrated free end adapted to engage the inner side of the tongue.

9. A nut lock consisting of a plurality of sheet metal bodies having openings to adapt them to be moved over the threaded portion of a bolt, means on said bodies to directly engage the threads of the bolt, a locking lever located between the bodies to engage the bolt, and a rivet constituting a pivot for the latter and connecting the bodies.

10. A nut lock consisting of a plurality of spaced sheet metal bodies having openings to adapt them to be moved over the threaded portion of a bolt, and a curved locking lever mounted on a pivot between the bodies and engaging the threaded portion of the bolt and partially encircling the latter.

11. A nut lock consisting of a plurality of sheet metal bodies having openings to adapt them to be moved over the threaded portion of a bolt, the walls of said openings having slits whereby portions of said bodies may be sprung in opposite directions to engage the threads of the bolt, and a separate locking device carried by the bodies and also adapted to engage the threaded portion of the bolt.

12. A nut lock consisting of a sheet metal body having an opening to adapt the same to be moved over the threaded portion of a bolt, means on said body to engage the threads of the bolt, and a separate locking device pivotally carried by the body and also adapted to engage the threaded portion of the bolt, said device being curved and partially encircling the bolt.

In testimony, that I claim the foregoing as my own, I have hereto affixed my signature in the presence of two witnesses.

PARIS R. HINKLE.

Witnesses:
 HERBERT WILLIAMS,
 EDGAR F. HUGHES.

Copies of this patent may be obtained for five cents each, by addressing the "Commissioner of Patents, Washington, D. C."